(12) United States Patent
Horie

(10) Patent No.: US 7,123,291 B2
(45) Date of Patent: Oct. 17, 2006

(54) IMAGE PROCESSING DEVICE, IMAGE PROCESSING METHOD AND IMAGE PROCESSING PROGRAM FOR JOINING A PLURALITY OF DIVIDED IMAGES

(75) Inventor: Daisaku Horie, Uji (JP)

(73) Assignee: Minolta Co., Ltd., Osaka (JP)

( * ) Notice: Subject to any disclaimer, the term of this patent is extended or adjusted under 35 U.S.C. 154(b) by 909 days.

(21) Appl. No.: 09/774,709

(22) Filed: Feb. 1, 2001

(65) Prior Publication Data

US 2001/0017945 A1 Aug. 30, 2001

(30) Foreign Application Priority Data

Feb. 3, 2000 (JP) ............................. 2000-026624

(51) Int. Cl.
*H04N 5/225* (2006.01)
(52) U.S. Cl. .................... 348/218; 348/36; 382/284
(58) Field of Classification Search ................ 348/218, 348/284, 294, 36; 382/284, 294, 295, 302
See application file for complete search history.

(56) References Cited

U.S. PATENT DOCUMENTS

| | | | |
|---|---|---|---|
| 5,982,951 A | * | 11/1999 | Katayama et al. .......... 382/284 |
| 6,038,349 A | * | 3/2000 | Cullen ....................... 382/294 |
| 6,424,752 B1 | * | 7/2002 | Katayama et al. .......... 382/284 |
| 6,552,744 B1 | * | 4/2003 | Chen ........................ 348/218.1 |
| 6,720,997 B1 | * | 4/2004 | Horie et al. ............. 348/218.1 |

FOREIGN PATENT DOCUMENTS

| | | |
|---|---|---|
| JP | 05-012430 | 1/1993 |
| JP | 06-098101 | 4/1994 |
| JP | 06-164890 | 6/1994 |
| JP | 9-321972 A | 12/1997 |
| JP | 9-322061 A1 | 12/1997 |

* cited by examiner

*Primary Examiner*—Tuan Ho
*Assistant Examiner*—Gevell Selby
(74) *Attorney, Agent, or Firm*—McDermott Will & Emery LLP

(57) ABSTRACT

An image processing device for joining a plurality of images while preventing deterioration of a quality of joined images, and particularly for producing an entire image of a subject by joining a plurality of divided images produced from divided portions of the subject having partially overlapping portions, including a setting portion for setting a plurality of sets each including corresponding points in the two divided images having overlap regions overlapped together, a transforming portion for performing geometric transformation of one or the other of the two divided images based on the plurality of corresponding point sets, and a joining portion for joining the two divided images based on the plurality of corresponding point sets after the geometric transformation, wherein higher importance is placed on a specific portion of the overlapping regions compared with the other in the geometric transformation.

16 Claims, 16 Drawing Sheets

F I G. 1
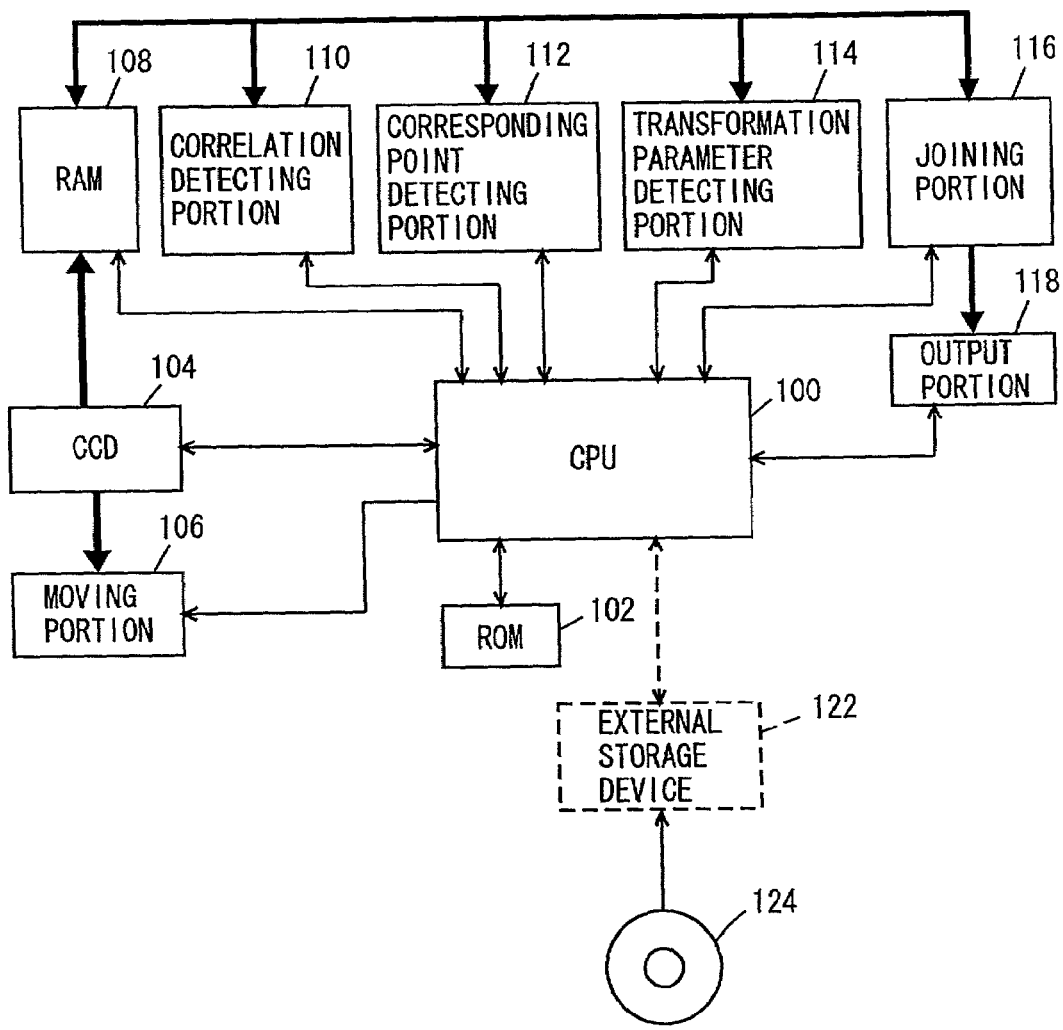

UPPER LEFT PARTIAL IMAGE P

UPPER RIGHT PARTIAL IMAGE Q

LOWER LEFT PARTIAL IMAGE R

LOWER RIGHT PARTIAL IMAGE S

F I G. 4
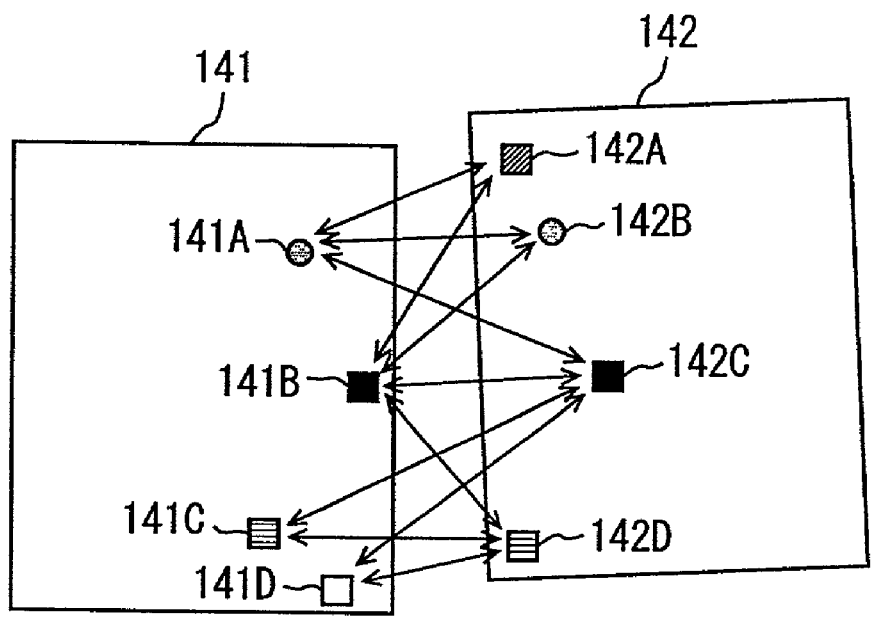
F I G. 5
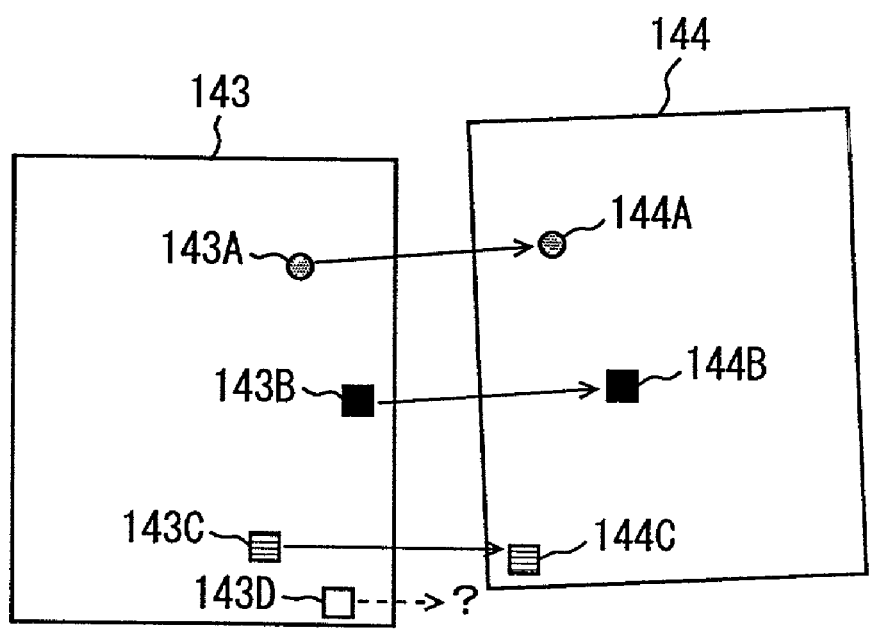

IMAGE PROCESSING DEVICE, IMAGE PROCESSING METHOD AND IMAGE PROCESSING PROGRAM FOR JOINING A PLURALITY OF DIVIDED IMAGES

This application is based on an application No. 2000-26624 filed in Japan, the content of which is hereby incorporated by reference.

BACKGROUND OF THE INVENTION

1. Field of the Invention

The present invention relates to an image processing device, an image processing method and an image processing program. Particularly, the invention relates to an image processing device, an image processing method and an image processing program for producing an image of a high resolution by joining a plurality of images obtained from divided portions of a subject.

2. Description of the Related Art

Such a technique has been known that can obtain an image of high resolution by joining a plurality of partial images obtained from divided portions of a subject. This is an effective technique for obtaining high-resolution images in the case where a resolution of an acquirable image is restricted due to the number of pixels of a charge coupled device (which will be referred to as a "CCD" hereinafter) or the like. This technique is disclosed, e.g., in Japanese Patent Laying-Open Nos. 6-164890, 5-12430 and 6-98101.

In the joining techniques disclosed therein, characteristic points and a correlation in change of pixel values are detected, and positioning or registration is performed based on the relative positional relationship between the images thus obtained.

In the conventional joining technique, however, regions of the partial images to be joined may not accurately overlap with each other due to shift in position occurred at the time of taking partial images by the CCD or the like, distortions in lens, affine strain or the like. In this case, unnatural images or blurred images are formed in a joint or border between joined images, resulting in low image quality.

Such a problem also arises that long times are required for detecting corresponding characteristic points in the divided images to be joined and detecting the correlation in change of the pixel values.

SUMMARY OF THE INVENTION

The invention has been developed for overcoming the above problems, and an object of the invention is to provide an image processing device, an image processing method, which can prevent deterioration of a quality of an image formed of a plurality of images joined together, and an image processing program achieving such prevention.

Another object of the invention is to provide an image processing device, an image processing method, in which a speed of processing of joining a plurality of images is increased, and an image processing program achieving such increase in speed.

According to an aspect, the invention for achieving the above objects provides an image processing device for producing an entire image of a subject by joining a plurality of divided images produced from divided portions defined in the subject and having partially overlapping portions, including a setting portion for setting a plurality of sets each including corresponding points in the two divided images having overlap regions overlapped together, a transforming portion for performing geometric transformation of one or the other of the two divided images based on the plurality of corresponding point sets, and a joining portion for joining the two divided images based on the plurality of corresponding point sets after the geometric transformation, wherein higher importance is placed on a specific portion of the overlapping regions compared with the other in the geometric transformation.

According to another aspect, the invention provides an image processing device for joining at least first and second divided images produced from divided portions defined in a subject and having partially overlapping portions, including a detecting portion for detecting a relative positional relationship between the first and second divided images having overlap regions overlapped together, a setting portion for setting a plurality of sets each including corresponding points in the two divided images within the overlapping regions based on the positional relationship detected by the detecting portion, and a joining portion for joining the two divided images based on the set corresponding point sets.

According to still another aspect, the invention provides an image processing method including the steps of obtaining a plurality of divided images produced from divided portions defined in a subject and having partially overlapping portions, and producing an entire image representing the subject by joining the plurality of produced divided images, wherein the joining of the divided images is performed while placing higher importance on a specific portion among the overlapping regions.

According to still another aspect, the invention provides an image processing method including the steps of obtaining a plurality of divided images produced from divided portions defined in a subject and having partially overlapping portions, detecting a direction of positional shift between the two divided images having the overlap regions overlapping with each other, setting a plurality of sets each including corresponding points in the two divided images based on the detected positional shift direction, and joining the two divided images based on the set corresponding point sets.

According to further another aspect, the invention provides an image processing program causing a computer to execute the steps of obtaining a plurality of divided images produced from divided portions defined in a subject and having partially overlapping portions, and producing an entire image representing the subject by joining the plurality of produced divided images, wherein the joining of the divided images is performed while placing higher importance on a specific portion among the overlapping regions.

According to further another aspect, the invention provides an image processing program causing a computer to execute the steps of obtaining a plurality of divided images produced from divided portions defined in a subject and having partially overlapping portions, detecting a direction of positional shift between the two divided images having the overlap regions overlapping with each other, setting a plurality of sets each including corresponding points in the two divided images based on the detected positional shift direction, and joining the two divided images based on the set corresponding point sets.

According to the invention, it is possible to prevent blurring and/or other conspicuous states of joined portions of the images. Therefore, the invention can provide the image processing device and the image processing method, which can prevent deterioration of a quality of the image completed by joining the plurality of images, and can also provide the image processing program.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a circuit structure of a scanner of an embodiment of the invention;

FIG. 4 shows a first method of detecting corresponding points;

FIG. 5 shows a second method of detecting the corresponding points;

DESCRIPTION OF THE PREFERRED EMBODIMENTS

Figure 2:
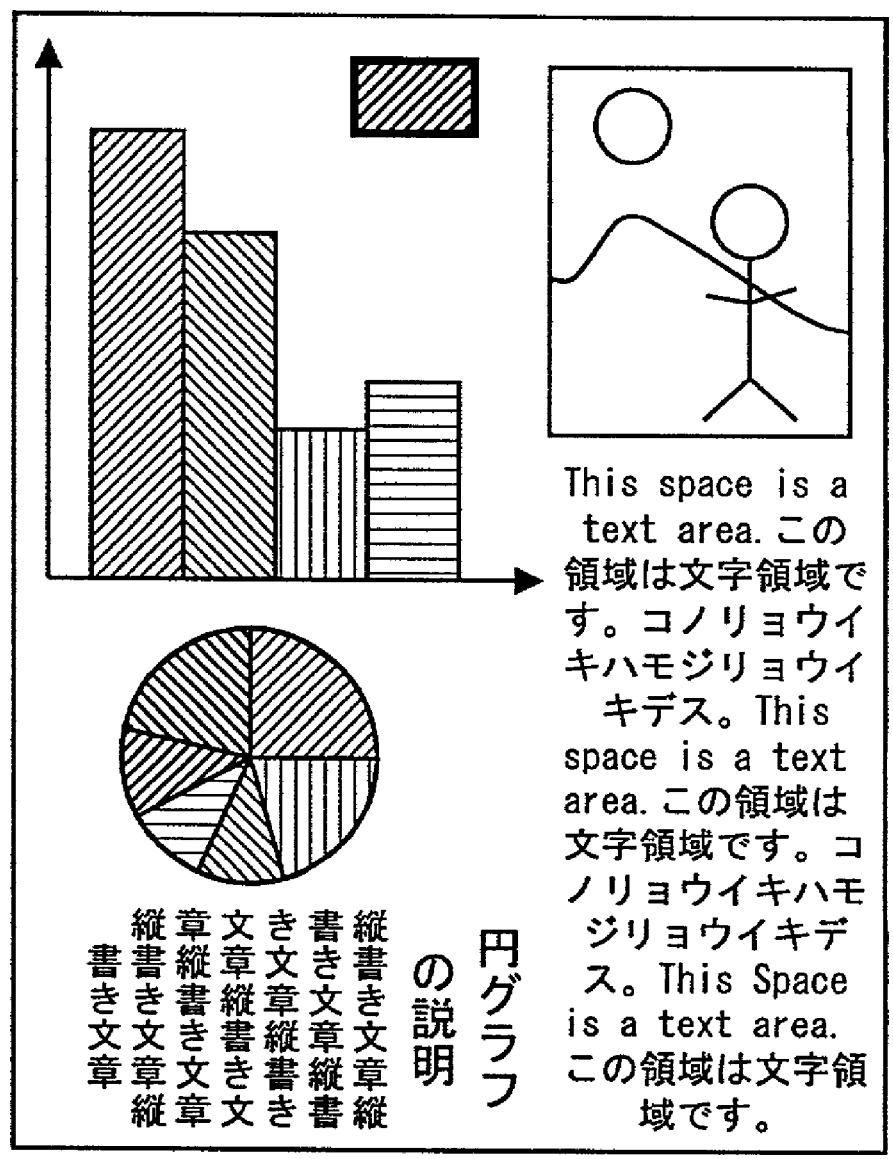
FIG. 2 shows an example of an original document.

A scanner provided with an image processing device of an embodiment of the invention will now be described with reference to the drawings. In the figures, the same or corresponding portions bear the same reference numbers, and description thereof is not repeated.

FIG. 1 is a block diagram showing a circuit structure of a scanner in an embodiment of the invention. Referring to FIG. 1, a scanner 1 includes a central processing unit (which will be referred to as a "CPU" hereinafter) for performing entire control of scanner 1, a CCD 104 serving as an image-taking element for taking or obtaining an image, a moving portion 106 for moving CCD 104 and thereby changing relative positions of CCD 104 and a subject, a random access memory 108 (which will be referred to as an "RAM" hereinafter) for temporarily storing an image sent from CCD 104, a correlation detecting portion 110 for detecting a correlation between the plurality of images stored in RAM 108, a corresponding point detecting portion 112 for detecting a plurality of corresponding points, which are present in two images to be joined and are in the corresponding relationship, a transformation parameter detecting portion 114 for detecting transformation parameters to be used for geometric transformation of the image, a joining portion 116 for joining two images together based on the detected transformation parameters and the corresponding points, an output portion 118 for outputting the joined images, and a read only memory 102 (which will be referred to as an "ROM" hereinafter) for storing a program to be executed by CPU 100.

An external storage device 122 may be connected to CPU 100 of scanner 1 for reading a program for controlling scanner 1 from a CD-ROM 124, magneto-optical disk, digital video disk, floppy disk or the like. In this case, the program for executing joining processing to be described later by CPU 100 is stored in the record medium such as CD-ROM 124, and external storage device 122 reads the program, whereby CPU 100 can execute the program. In the case where CPU 100 executes the program for performing the joining processing, it is not necessary to provide correlation detecting portion 110, corresponding point detecting portion 112, transformation parameter detecting portion 114 and joining portion 116.

The joining processing which will be described later may be performed within scanner 1. Data may be set to another scanner or a computer terminal connected to scanner 1 for performing the processing therein. In this case, the foregoing joining processing program is sent into the personal computer from the record medium such as a CD-ROM, and is executed by the CPU of the personal computer. The personal computer is provided with an interface for capturing divided images obtained by the scanner connected thereto.

Scanner 1 of this embodiment obtains partial images from divided portions of an original, and joins the plurality of divided partial images to output one image. Specifically, this embodiment can be applied, for example, to a digital camera or a scanner such as a scanner BC3000 manufactured by Minolta Co., Ltd., which can take an images of, e.g., a page(s) of a book from a higher side. For simplicity reason, scanner 1 will now be described in connection with an example, in which images are obtained from four portions prepared by dividing an original into four, and the obtained four partial images are joined together.

The original may be divided into a number other than four, and may be divided into a number larger than four or an arbitrary even or odd number.

Referring to FIG. 1, CCD 104 starts integration in accordance with an instruction sent from CPU 100, and dumps the CCD data to RAM 108 after the above integration is completed. Thereby, RAM 108 stores one partial image.

Moving portion 106 moves the image-taking position of CCD 104 in accordance with the instruction sent from CPU 100 so that CCD 104 can take partial images from the plurality of different portions. For obtaining the images by scanner 1 from the divided four portions, the original is divided into upper left, upper right, lower left and lower right portions. Moving portion 106 moves the position of CCD 104 so that one of the divided four portions of the original may be located within an image-taking range of CCD 104. The positions of CCD 104 is determined such that the neighboring two partial images overlap with each other. Scanner 1 may be configured to move the original instead of moving CCD 104. Neither CCD 104 nor the original may be moved, and an optical system between them may be moved to change the image-taking region for obtaining divided images.

The operations of moving CCD 104 by moving portion 106 and taking an image by CCD 104 are repeated to obtain upper left, upper right, lower left and lower right images from the upper left, upper right, lower left and lower right portions of the original, respectively.

Figure 3A:
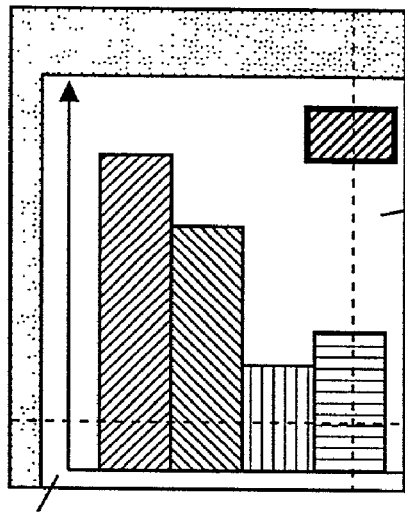
FIGS. 3A–3D show four partial images obtained from four divided portions of the original shown in FIG. 1.
Figure 3B:
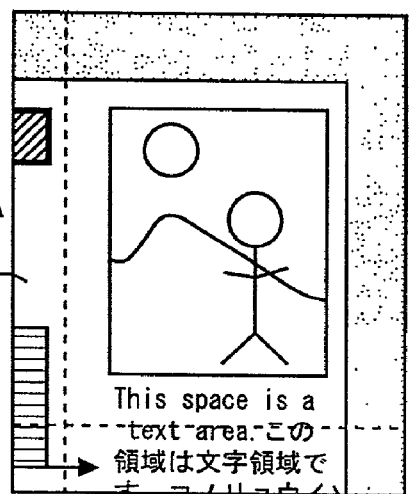
Figure 3C:
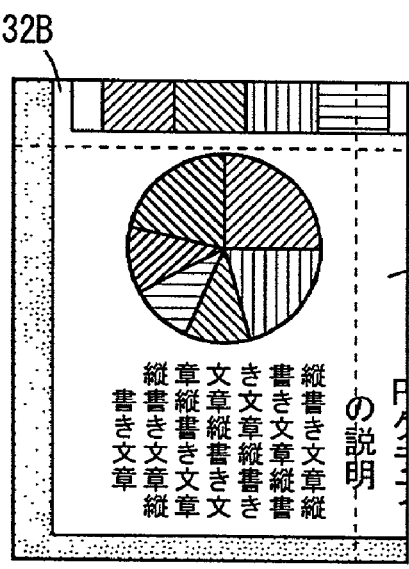
Figure 3D:

FIG. 2 shows an example of the original. FIGS. 3A–3D show an example of the four partial images obtained by dividing the original shown in FIG. 2 into four. FIG. 3A shows an upper left partial image P, FIG. 3B shows an upper right partial image Q, FIG. 3C shows a lower left partial image R and FIG. 3D shows a lower right partial image S.

An overlap region 130A at the right of upper left partial image P overlaps with an overlap portion 130B at the left of upper right partial image Q. An overlap portion 132A at the bottom of upper left partial image P overlaps with an overlap portion 132B at the top of lower left partial image R. Likewise, an overlap portion 131B at the left of lower right partial image S overlaps with an overlap portion 131A at the right of lower left partial image R. An overlap portion 133B at the top of lower right partial image S overlaps with an overlap portion 133A at the bottom of upper right partial image Q.

These overlapped portions 130A and 130B contain the substantially same partial image of the subject except for an error in images. Likewise, overlapped portions 131A and 131B, 132A and 132B, and 133A and 133B contain the substantially same partial images of the subject except for errors in images.

Correlation detecting portion 110 of scanner 1 detects correlation between the plurality of portions stored in RAM 108. The correlation represents the relative positional relationship between the two partial images to be joined. It is preferable that CCD 104 obtains the partial images in such a state that the partial images adjoining in the horizontal direction match with each other in the vertical direction, and the partial images adjoining in the vertical direction match with each other in the horizontal direction. However, shifts in the vertical or horizontal directions may often occur in actual cases. For example, left and right upper partial images P and Q, which are shown in FIGS. 2A and 2B, respectively, shift vertically from each other, and upper and lower left partial images P and R shift horizontally from each other.

The relative positional relationship is expressed by one between the two partial images to be joined, and particularly the partial image shifted toward the center of the original. For example, the relationship between left and right upper partial images P and Q shown in FIGS. 3A mad 3B is represented by the partial image shifted downward because the center of the original is shifted downward with respect to them. The relationship between left and right lower partial images R and S is represented by the partial image shifted upward because the center of the original is shifted upward. The relationship between upper and lower left partial images P and R is represented by the partial image shifted rightward because the center of the original is shifted rightward. The relationship between upper and lower right partial images Q and S is represented as the partial images shifted leftward because the center of the original is shifted leftward.

The relative positional relationship can be easily detected in the following manner. The plurality of partial images stored in RAM 108 are reduced into an image of a lower resolution, the two partial images selected from the reduced partial images are roughly positioned using a correlation between pixel values at and around the vertical or horizontal centers of the selected two partial images. Alternatively, comparison is made between distributions in horizontal or vertical projective histograms of the two partial images. Thereby, the partial image shifted toward the center of the original can be easily determined between the partial images.

The purpose of using the reduced image of a low resolution is to improve the processing speed. Therefore, it is not necessary to increase a processing speed, it is not necessary to use the reduced images.

Based on the output of moving portion 106, RAM 108 may store the positions (i.e., upper left, upper right, lower left and lower right positions) of the respective partial images together with the partial images obtained by CCD 104. This facilitates determination of the relative positional relationship.

Corresponding point detecting portion 112 of scanner 1 detects the corresponding points, which are common to the partial images to be joined, based on the relative positional relationship detected by correlation detecting portion 110. The corresponding points obtained by corresponding point detecting portion 112 are stored in RAM 108.

The two partial images can be joined in such a manner that the two partial images are overlapped together in all the possible combinations for achieving the highest correlation, and thereby the correlation between the images is obtained. In this case, the correlation is first obtained from the reduced images, and then the resolution is gradually increased. Difference values between the two images or the like are used for expressing the correlation. According to this method, the correlation can be obtained with certain accuracy and within a short processing time if the two images can be joined by dealing with only parallel shift without requiring geometric transformation. If the geometric transformation, e.g., for rotary movement or change in scale factor is required for joining the two images, it is preferable for improving the processing speed to determine the correlation locally or region by region.

There are two methods for detecting the corresponding points corresponding to each other in the two partial images. FIG. 4 shows a first method of detecting the corresponding points. In the first method shown in FIG. 4, characteristic points 141A–141D included in one (141) of partial images 141 and 142 and characteristic points 142A–142D included in the other partial image 142 are detected, and each of characteristic points 141A–141D included in partial image 141 is compared with all characteristic points 142A–142D included in other partial image 142 for determining whether the correlation is present or not. According to this method, each of the characteristic points included in one of the partial images is compared with all the characteristic points included in the other partial image for determining the presence of the corresponding relationship. Therefore, this method requires a long processing time.

FIG. 5 shows the second method of detecting the corresponding points. In the second method shown in FIG. 5, characteristic points 143A–143D included in one (143) of the partial images are detected, and the characteristic points corresponding to detected characteristic points 143A–143D are detected from other partial image 144.

The characteristic point can be, e.g., an edge, a point of a maximum pixel value, a point of a minimum pixel point obtained by secondary differential filtering. The characteristic points are not restricted to them obtained by the above manner, and may be obtained by other known methods. The characteristic point may not be a point, but may be a characteristic region formed of a set of points.

The correlation between the characteristic points can be detected by obtaining a sum of absolute values of the differences between the images of the block having a center defined by the characteristic points included in one of the partial image and the block having a center defined by the characteristic points included in the other image, and determining the combination of the blocks providing the minimum sum of the absolute values.

The second method has such an advantage that the required processing time is shorter than that of the first method. However, in the case where one partial image 143 is shifted downward with respect to other partial image 144 as shown in FIG. 5, a characteristic point corresponding to characteristic point 143D included in one partial image 143 is not present in other partial image. In this case, such a problem may occur that an incorrect characteristic point which is not originally in a corresponding relationship is erroneously detected in other partial image 144, or an extra processing time is required for detecting the corresponding point.

This problem can be overcome by detecting the corresponding characteristic points based on the partial image located in a further outer position. The further outer position is determined from the relative positions of the two partial images to be joined, and is determined as a position remote from a region where three or more images including the other partial image overlap with each other. The partial image in the further outer position is detected based on the output of correlation detecting portion 111.

Figure 6:
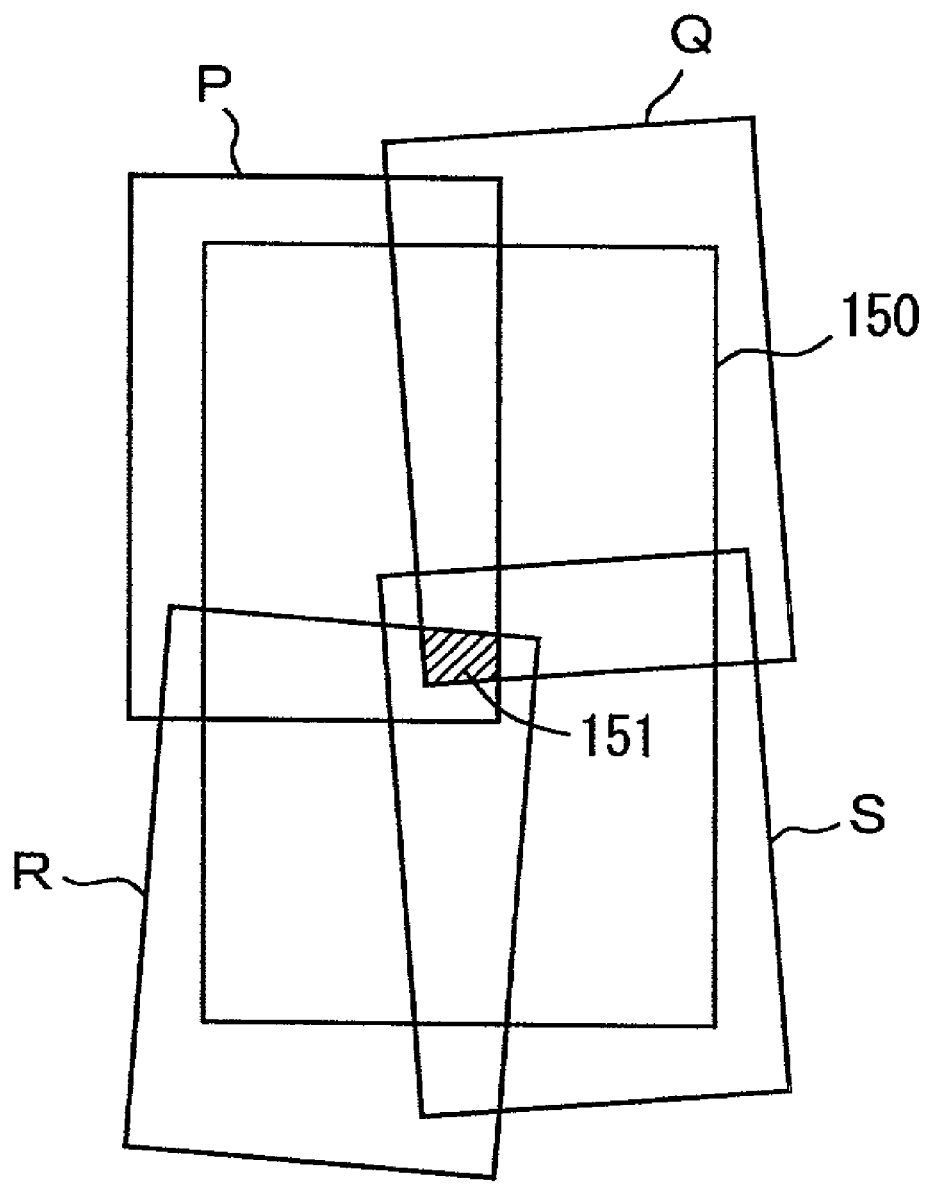
FIG. 6 shows a result of joining the four partial images obtained from an original divided into four.

FIG. 6 shows a result of four partial images obtained from the original divided into four. Four partial images P, Q, R and S are joined together so that four partial images overlap with each other in an overlap region 151. Overlap region 151 is located substantially in a center of an image 150 formed of four partial images P, Q, R and S joined together.

Two partial images P and Q in the upper side are positioned such that upper right partial image Q is shifted away from overlap portion 151 with respect to left partial image P. Therefore, upper right partial image Q is in the partial image, which is located in the further outer position, and is the partial image forming the reference.

Upper left partial image P and lower left partial image R are relatively positioned such that upper left partial image P is shifted away from overlap portion 151 with respect to lower left partial image R. Therefore, upper left partial image P is in the partial image, which is located in the further outer position, and is the partial image forming the reference. Likewise, lower left partial image R and lower right partial image S are relatively positioned such that lower left partial image R is in the further outer position, and form the reference. Upper and lower right partial images Q and S are relatively positioned such that upper right partial image Q is in the further outer position, and forms the reference.

Among four partial images P, Q, R and S shown in FIG. 6, the correspondence between the characteristic points, which are included in upper two partial images P and Q, will now be discussed. Upper right partial image Q forming the reference has an upper end, which does not overlap with upper left partial image P. It is clear that upper left partial image P does not contain the characteristic point corresponding to the characteristic point which is present in the above region which does not overlap. Therefore, characteristic points, which are included in upper right partial image Q but are remote from overlap portion 151, are not detected for performing appropriate processing.

Figure 7:
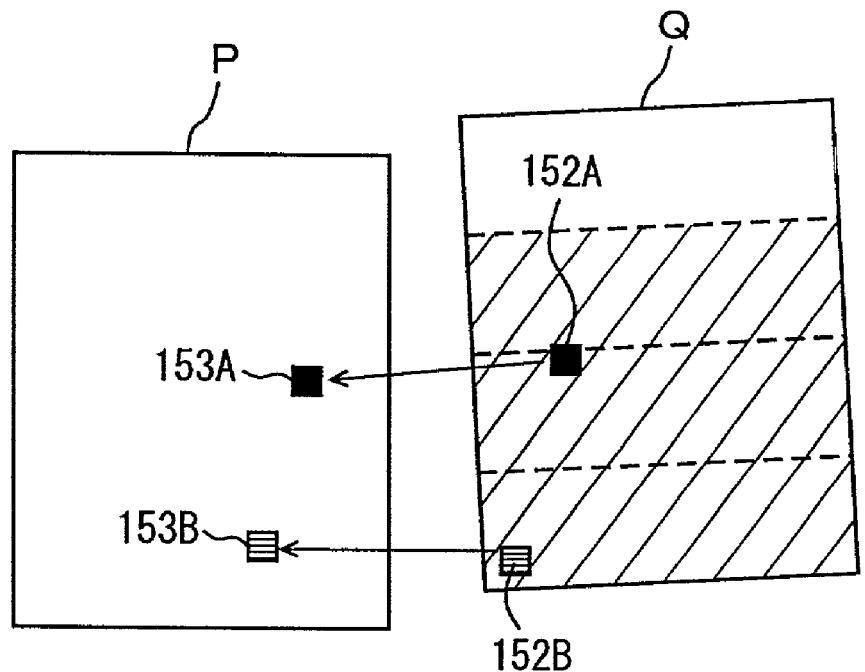
FIG. 7 is a view showing processing of detecting corresponding points corresponding together in upper left and upper right partial images.

FIG. 7 shows processing for detecting corresponding points in partial images P and Q. Upper right partial image Q forming the reference is equally divided into four, and characteristic points 152A and 152B included in the lower three regions among the four regions thus divided are detected. Characteristic points 153A and 153B which correspond to characteristic points 152A and 152B, respectively, are detected in upper left partial image P. If the plurality of characteristic points are detected in each region, the leftmost character point is employed. This is because the probability that the leftmost characteristic point is included in the left partial image P is the highest. This increases the probability that the characteristic point corresponding to the characteristic point detected from the upper right partial image Q forming the reference is detected from the upper left partial image P. Therefore, an extra processing time is not required.

In contrast to this, such a manner may be employed that upper left partial image P which is not in the further outer position is used as the reference, the characteristic points are detected from the upper three regions among the four regions defined by vertically dividing upper left partial image P into four, and the characteristic points corresponding to the detected characteristic points are detected in upper right partial image Q. The characteristic points included in the lowermost region of upper left partial image P are located at or around the center of image 150 formed of the joined partial images. Since changes in quality of the portion at and near the center of image 150 are more conspicuous that those at and near the end of image 150. Therefore, the corresponding points at and near the center are more important than those at and near the end. Accordingly, it is preferable to detect the corresponding points using the upper right partial image Q in the further outer position as a reference.

The partial image is equally divided into four. If the amount of the relative position shift between the two partial images to be joined can be detected by correlation detecting portion 110, such a manner may be employed that the characteristic points included in the region corresponding to this shift amount are not detected.

Figure 8:
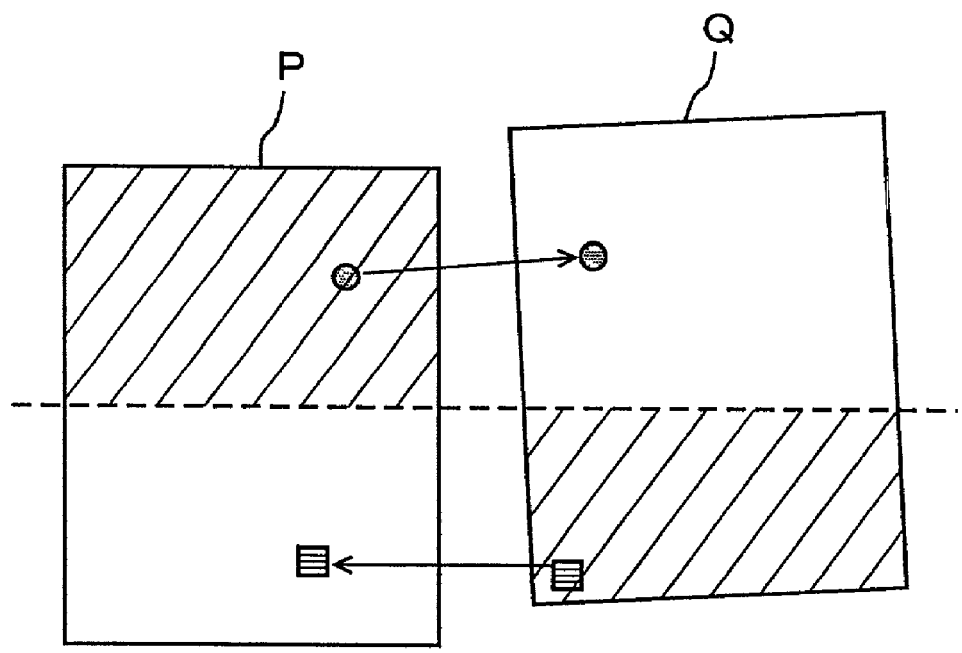
FIG. 8 is another view showing processing of detecting corresponding points corresponding together in upper left and upper right partial images.

There is also a manner in which the partial image handled as the reference is changed depending on the positions of the corresponding points. FIG. 8 is another view showing detection of the corresponding points in partial images P and Q. When the corresponding points are detected in the upper halves of partial images P and Q shown in FIG. 8, upper left partial image P in the further inner position is used as the reference. When the corresponding points are detected in the lower halves, upper right partial image Q in the further outer position is used as the reference. The partial image in the further inner position is the partial image shifted toward overlap region 151 with respect to the other, and the partial image in the further outer position is the partial image shifted away from overlap region 151 with respect to the other.

In addition to the relative positional relationship between the two partial images to be joined, the positions of the characteristic points in the partial image can be used as the reference for changing the partial image forming the reference, whereby the corresponding points can be detected more reliably.

Figure 9:
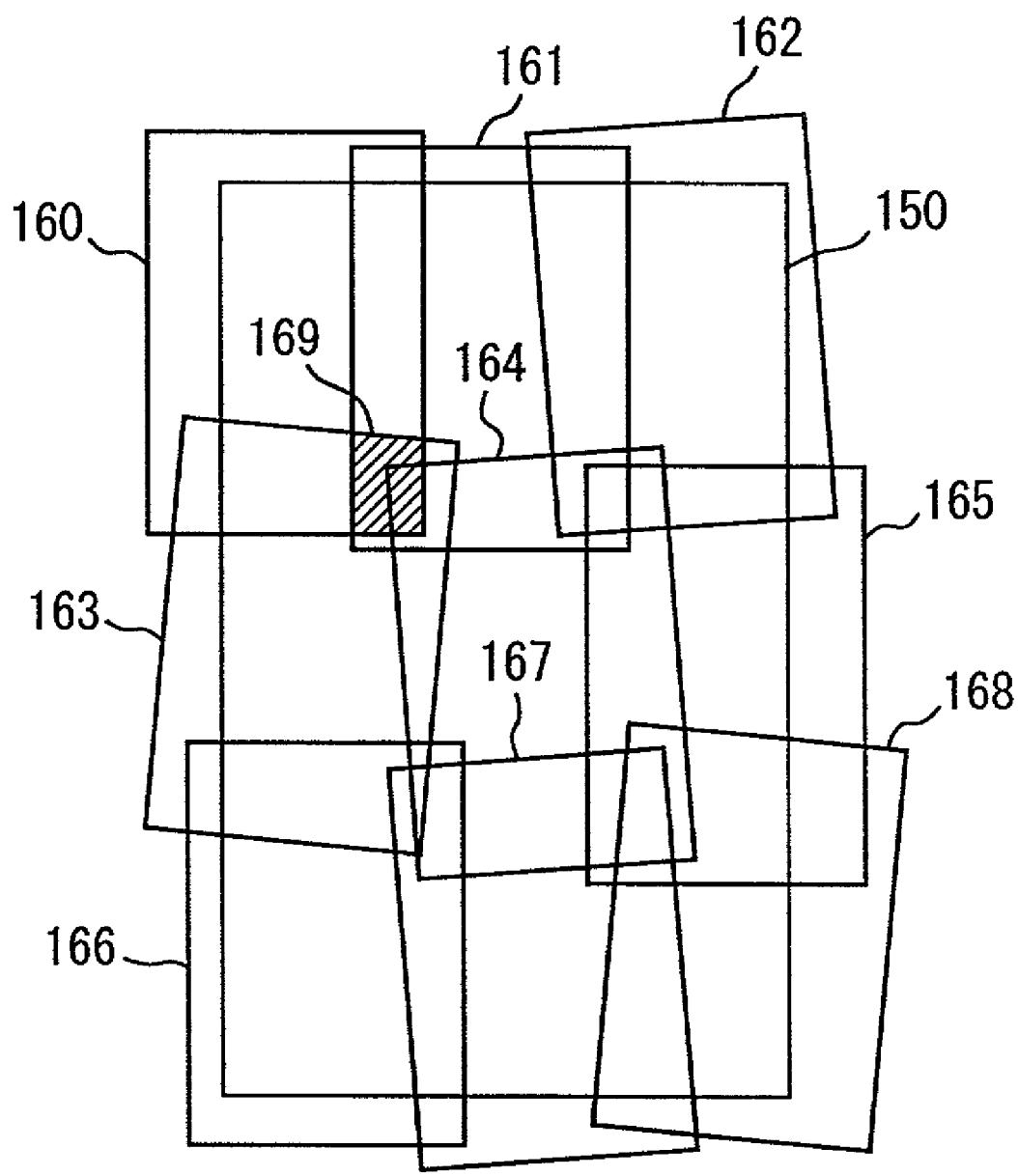
FIG. 9 shows a result of joining nine partial images obtained from an original divided into four.

FIG. 9 shows a result of joining nine partial images obtained from the original divided into nine. The detection of the corresponding points from four or more partial images to be joined is performed using the partial image, which is shifted away from the overlapping region of the three partial images, as a reference. For example, if three partial images 160, 161 and 163 are joined together, a region 169 where three partial images 160, 161 and 163 overlap with each other, is present. In the relative positional relationship between partial images 160 and 161, partial image 160 is shifted outward from overlap region 169 to a larger extent. Therefore, the detection of the corresponding points in the partial images 160 and 161 is performed using partial image 160 as a reference. Likewise, in the relative positional relationship between partial images 160 and 163, partial image 160 is shifted outward from overlap region 169 to a larger extent. Therefore, the detection of the corresponding points in the partial images 160 and 163 is performed using partial image 160 as a reference.

The foregoing manner of detecting the corresponding points can be used not only for the case of joining the three or more partial images but also for the case of joining the two partial images. For example, if determination of the relative positional relationship (i.e., determination of the partial image in the upper position) is not be performed in connection with the left and right divided partial images, the range for detection of the characteristic points, which are used for the corresponding point detection, can be defined in advance within the reference partial image, whereby the corresponding points can be detected.

However, the range for detecting the characteristic points must be located at or around the vertical center of the left partial image. Therefore, the detected corresponding points are concentrated at and around the center of the image. Therefore, upper or lower end of the joined images may blur. Further, the characteristic points may not be detected if the characteristic region is present in the upper or lower end, and is not present in the central portion.

In contrast to the above, the method of detecting the corresponding points already described with reference to FIGS. 7 and 8 can be used if the relative positional relationship between the left and right partial images is already known. For example, when it is already known that the left partial image is shifted downward with respect to the right partial image, the lower portion of the right partial image is reliably present within the left partial image if an extreme difference in size is not present between the two partial images. Therefore, the characteristic points of the lower region of the right partial image can be detected using the right partial image as a reference, and the characteristic points corresponding to the detected characteristic points can be reliably detected from the left partial image. In this manner, the optimum corresponding points can be reliably detected by using the relative positional relationship between the two partial images even for joining the two partial images.

Parameter detecting portion 114 of scanner 1 obtains transformation parameters for performing geometric transformation of the partial images based on the corresponding points obtained by corresponding point detecting portion 112. Affine transformation or Helmert's transformation may be used for transformation of the partial images.

Description will now be given on the calculation of transformation parameters for joining the left and right partial images. The transformation parameters can be determined based on F, which is the transformation parameter of the right partial image using the left partial image as the reference, and more specifically, can be determined by obtaining F, which minimize a value S in the following evaluation formula.

$$S = \Sigma (Pi - F(Qi))^2 \quad (1)$$

where Pi represents the position of the characteristic point in the left partial image, and Qi represents the position of the characteristic point in the right partial image.

Further, the following evaluation formula (2), which is prepared by giving high weight to the foregoing evaluation formula (1), can be used for placing importance on a specific characteristic point pair (Pi, Qi).

$$Sk = \Sigma Ki(Pi - F(Qi))^2 \quad (2)$$

where Ki shows weight given to the respective characteristic points.

In the foregoing formula (2), a coefficient Ki can be increased for obtaining transformation parameter F for specific points on which importance is placed.

If the degree of importance on the specific point can be changed depending on the position in the overlapping region, the methods of calculating transformation parameter F and method of placing importance on the characteristic point are not restricted to the foregoing method.

In the process of joining partial images P, Q, R and S obtained by dividing the original into four as shown in FIG. 6, the quality at and around the center of completed image 150 is improved by increasing the importance on the corresponding points included in overlap region 151 or the neighboring region. Likewise, in the process of joining the nine partial images prepared by dividing the original or subject into nine as shown in FIG. 9, the quality of completed image 150 can be improved by increasing the degree of importance of the corresponding points, which are included in the overlap region (e.g., overlap region 169) defined by at least the three partial images or the neighboring region.

The degree of importance may be determined depending on the number of the partial images overlapping in the overlap region. The degree of importance is increased in the region, where more partial images overlap with each other, or the neighboring region. Thereby, it is possible to prevent reduction in quality of completed image 150.

Joining portion 116 of scanner 1 joins the partial images stored in RAM 108 based on the corresponding points detected by corresponding point detecting portion 112 and the transformation parameters detected by transformation parameter detecting portion 114. The joining method may be roughly divided into a method of butt joint and a method using a weighted average.

In the joining process utilizing the butt joint, two partial images are joined along certain line. In the joining process utilizing the weighted average, the pixel values of the pixels within the overlapping regions of the two partial images to be joined are averaged with variable weights depending on the positions, and the average value thus obtained is used as the pixel value in the overlap region for performing the joining.

The joining process utilizing the butt joint can be effectively used for regions, where a change in pixel value between a certain pixel and a neighboring pixel is small, as can be seen, e.g., in a character region containing characters. However, the joining process utilizing the butt joint is unpreferable for a region, where pixel values continuously change, as can be seen in a photograph region containing a photograph or the like, because joint or border line becomes conspicuous.

Figure 10A:
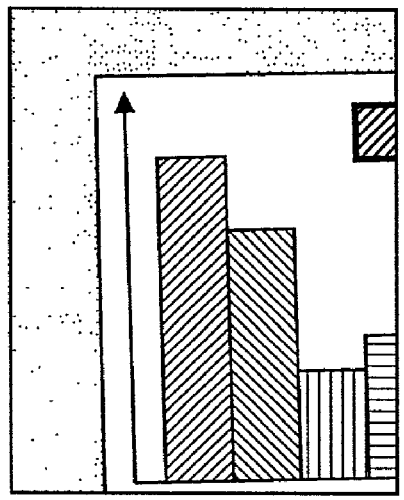
FIGS. 10A–10C show joining processing for joining two partial images by butt joint.
Figure 10B:
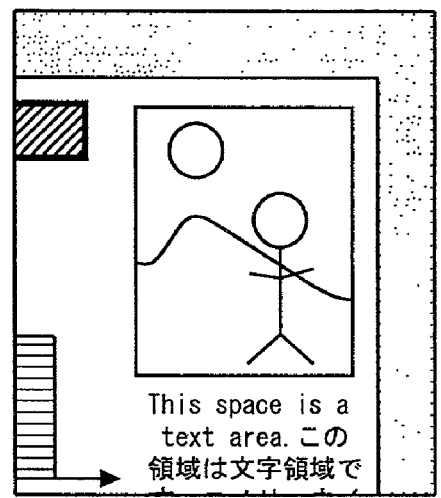
Figure 10C:
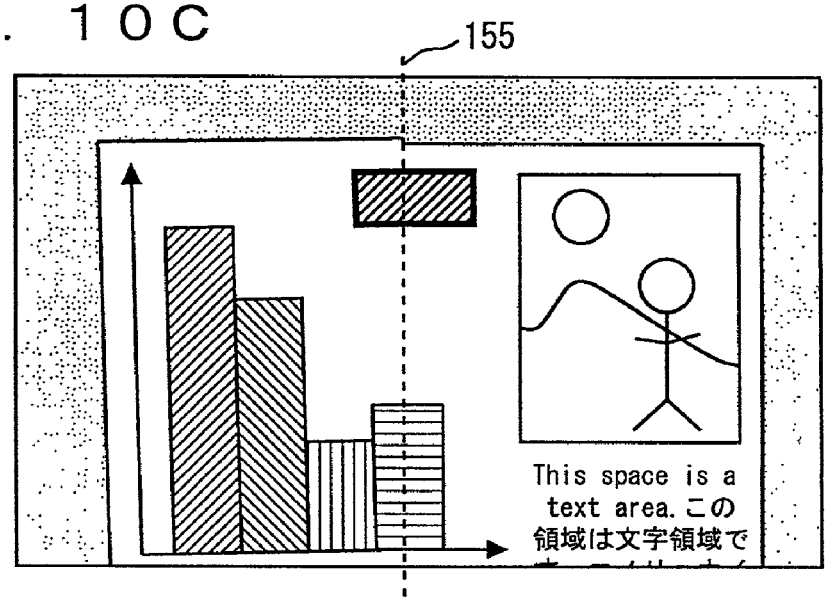

FIGS. 10A, 10B and 10C show joining of the two partial images in the joining process utilizing the butt joint. FIGS. 10A and 10B show partial images to be joined, and FIG. 10C shows a result of the joining process performed by butting the two partial images on certain line. The partial image shown in FIG. 10A and the partial image shown in FIG. 10B are joined together on line 155. Line 155 extends across a graph contained in both the two partial image.

In contrast to this, the joining process utilizing the weighted average is performed in such a manner that the average value is obtained by varying the weights depending on the position in the overlap region between the two partial images, and is used as the pixel value in the overlap region. Therefore, this process is effective for the joining in the region such as a photograph region, where the pixel value continuously varies.

Figure 11A:
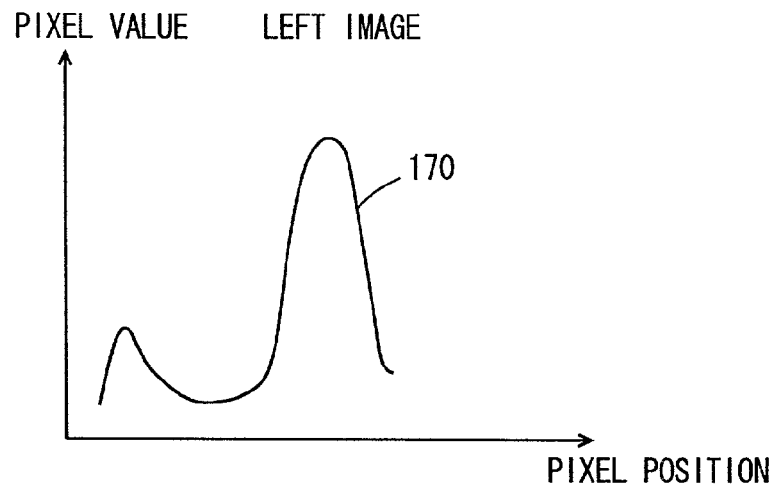
FIGS. 11A–11C show a principle of joining processing using weighted average.
Figure 11B:
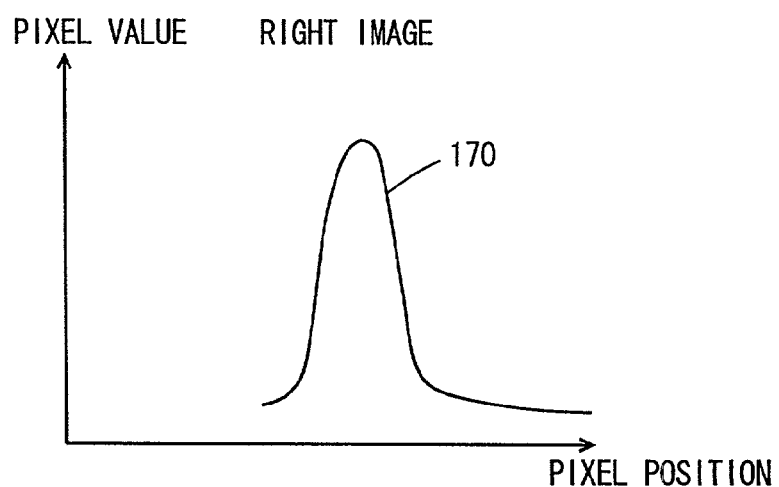
Figure 11C:
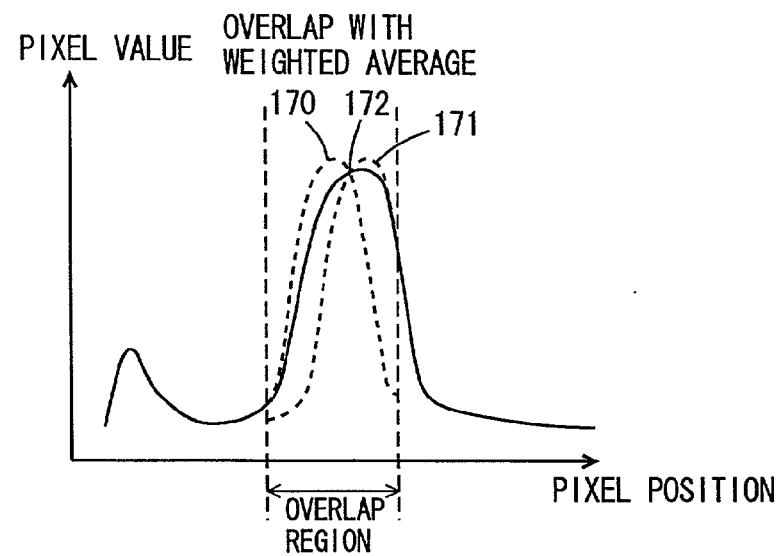

FIGS. 11A, 11B and 11C show a principle of the joining process utilizing the weighted average. The example shown in FIG. 11 relates to joining of the left and right partial images. FIG. 11A shows change in pixel value, which occurs in the horizontal direction within the left partial image. FIG. 11B shows change in pixel value, which occurs in the horizontal direction within the right portion. The pixel values shown in FIGS. 11A and 11B correspond to each other. In FIG. 11A, pixel value change 170 is defined by the pixel values in horizontal pixel positions within the left partial image. In FIG. 11B, pixel value change 171 is defined by the pixel values in horizontal pixel positions within the right partial image.

FIG. 11C shows overlapping using the weighted average. Referring to FIG. 1C, pixel value changes 170 and 171 in the left and right partial images are combined to provide pixel change 172, which is represented by solid line 172 in FIG. 1C, and are defined by the average values obtained with variable weights depending on the pixel position in the overlap region. According to the joining process using the weighted average, as described above, the weighted averages in the left and right partial images are used in the overlap region between the left and right partial images so that a joint or border between the joined images is not conspicuous.

Accordingly, the joining process using the weighted average is effective for both the character region and the photograph region. Joining portion 116 of scanner 1 of the embodiment can perform either the joining process utilizing the butt joint or the joining process using the weighted average. Description will now be given on an example of the joining process using the weighted average, which can be used for either the character region or the photograph region.

Joining portion 116 performs geometric transformation such as affine transformation on the partial images to be joined, based on transformation parameters obtained by transformation parameter detecting portion 114. The two partial images are joined together based on the corresponding points obtained by corresponding point detecting portion 112.

The transformation parameters, which are detected by transformation parameter detecting portion 114 based on the corresponding points obtained by corresponding point detecting portion 112, ensures the matching between the two partial images in and around the position where the corresponding points of the two images to be joined are present. However, the two partial images obtained by CCD 104 may not completely match with each other in a portion of the overlap region, where the two partial images overlap with each other, and particularly in the portion other than the portion in and around the position where the corresponding points are present.

If the detection of the corresponding points is performed using fast detection algorithm, the correspondence in a local region is detected with a precision of about one pixel unit. Therefore, the transformation parameter, which is detected based on the corresponding point detected with this precision, may contain an error smaller than one pixel.

Figure 12A:
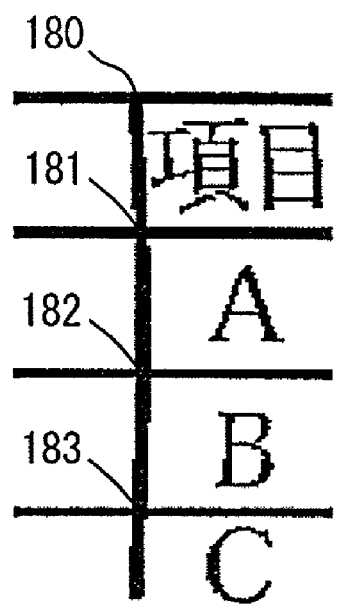
FIGS. 12A and 12B fragmentarily show by way of example an upper left partial image and an upper right partial image to be joined.
Figure 12B:
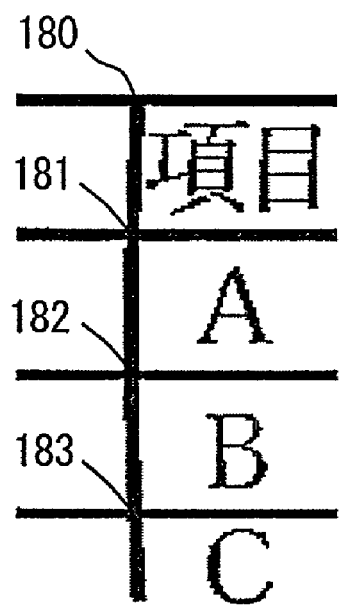

As described above, If the partial images to be joined do not match with each other in the region, where the partial images overlap with each other, but are joined with the weighted average, the completed image may be blurred or doubled so that the image quality lowers. This will be described below in greater detail, FIGS. 12A and 12B show an example of the partial images to be joined. FIG. 12A shows a portion of the left partial image, and FIG. 12B shows a portion of the right partial image. The images shown in FIGS. 12A and 12B are included in the partial image portions in the overlap region, respectively. The partial images shown in FIGS. 12A and 12B do not completely match with each other. It is now assumed that four corresponding points 180, 181, 182 and 183 are detected in FIGS. 12A and 12B.

Figure 13A:
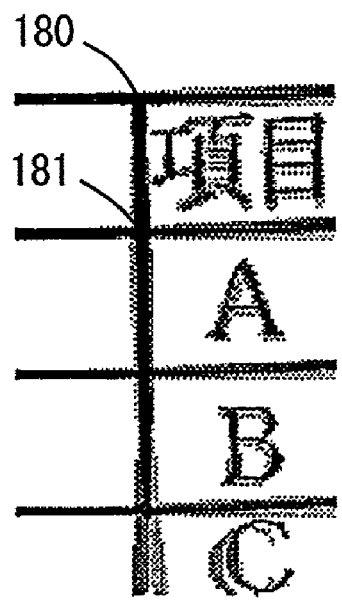
FIGS. 13A and 13B show a result of joining with different degrees of importance placed on corresponding points.
Figure 13B:
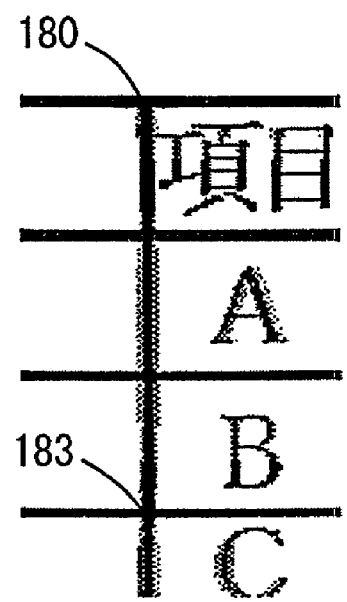

FIGS. 13A and 13B show results of joining performed with different degrees of importance placed on the corresponding points. FIG. 13A shows the result of joining with the weighted average, which is determined with higher importance placed on corresponding points 180 and 181. FIG. 13B shows the result of joining with the weighted average, which is determined with higher importance placed on corresponding points 180 and 183. In FIG. 13A, the corresponding points on which the importance is placed are shifted upward. The images may be subjected to the geometric transformation using the transformation parameter, which is obtained with the importance placed on corresponding points 180 and 181 shifted upward, and the images thus subjected to the geometric transformation may be joined by the processing using the weighted average. In this case, an error in geometric transformation occurs in the lower portion. Therefore, the lower portions of the joined images are blurred or doubled.

In contrast to this, as shown in FIG. 13B, the images may be subjected to the geometric transformation using the transformation parameter, which is obtained with the importance placed on vertically spaced points 180 and 181, and the images thus subjected to the geometric transformation may be joined by the process using the weighted average. In this case, an error in geometric transformation can be suppressed, and the deterioration in quality of the joined images can be prevented.

Accordingly, the degree of importance of the corresponding points, which are used for detecting the transformation parameters from the plurality of corresponding points detected by corresponding point detecting portion 112, as well as the degree of importance of the corresponding points used in the joining process are determined based on the following bases.

(1) The corresponding points to be selected increase the degree of importance of the corresponding points which are spaced from each other as far as possible. In other words, it is determined to increase the degree of importance of the corresponding points such that the selected corresponding point and the corresponding point are spaced by a predetermined distance.

(2) It is determined to increase the degree of importance of the corresponding points included in and around the region, where the plurality of images overlap with each other.

The item (2) may also be expressed as "the degree of importance of the corresponding point near the center of the image formed of the joined images is increased".

In this invention, "to place importance on the corresponding point" and "not to place importance on the corresponding point" include concepts of "to utilize the corresponding point" and "not to utilize the corresponding point" in addition to the concepts of "to increase the importance on the corresponding point" and "not to increase the importance on the corresponding point", respectively.

If the corresponding points deemed to be important are distributed or dispersed, it is possible to prevent deterioration of the quality of the joined images, as compared with the case where the corresponding points deemed to be important are not distributed. The distributed corresponding points may be detected in such a manner that the partial image is forcedly divided into a plurality of portions, and the characteristic points detected in the respective divided portions are utilized for detecting the corresponding points. Also, the corresponding points may be detected from the plurality of obtained corresponding points by utilizing the corresponding points in or near the upper and lower ends when the horizontally shifted partial images are to be joined, or by utilizing the corresponding points in or near the left and right ends when the vertically shifted partial images are to be joined.

In this embodiment, weighting coefficient Ki in the evaluation formula (2) is used for "placing the importance". However, the importance may be placed based on the distribution of the corresponding points used for evaluation. Thus, the evaluation may be performed in accordance with the evaluation formula (1) while employing more corresponding points in and around the region, where the plurality of divided images overlap, as well as the region near the center of the completed image formed of the joined partial images.

In the case where the two partial images obtained from the original divided into two are to be joined together, the joining may be performed while placing the importance on the corresponding points near the center of the completed image, whereby the high quality can be achieved in the region which is located in a middle portion of the image, and thus is conspicuous.

The embodiment has been described in connection with the method of joining the two partial images. However, it may be envisaged to employ such a method that four partial images obtained from the original divided into four are simultaneously joined together to complete one image plane. In this case, the importance of the corresponding points is determined based on the correspondence between the two partial images to be joined, and therefore the positions of the corresponding points as well as the relative positional relationship between the partial images can be determined and handled similarly to the case of completing the image by joining the two partial images.

In scanner 1 of the embodiment, as described above, the geometric transformation and joining of the partial images are performed with the high importance placed on the corresponding points in and around the overlap region, where the four partial images obtained from the original divided into four overlap with each other. Therefore, it is possible to prevent lowering of the quality in the region where the plurality of partial images overlap. Further, the region where three or more partial images overlap is located near the center of the completed image. Therefore, it is possible to prevent lowering of the quality in the central region of the image.

Among the corresponding points used for joining the two partial images, the importance is placed on the corresponding points in the distributed positions, respectively. Therefore, it is possible to prevent such a disadvantage that the completed image is blurred or doubled due to inappropriate geometric transformation in the joining process.

Further, the corresponding points are detected based on the relative positional relationship between the partial images to be joined. Therefore, the corresponding points can be detected reliably. It is not necessary to perform extra comparison and detection for detecting the corresponding points so that the processing speed can be improved.

The corresponding points are detected based on the relative positions of the partial images to be joined as well as the positions of the corresponding points in the respective partial images. Therefore, the corresponding points can be detected more reliably.

Description will now be given on the flow of the joining processing performed by CPU 100 in scanner 1. In this case, it is not necessary to use correlation detecting portion 110, corresponding point detecting portion 112, transformation parameter detecting portion 114 and joining portion 116. The joining program is stored in a CD-ROM 124, and an external storage portion 122 reads out the program stored in CD-ROM 124 for executing it by CPU 100.

Figure 14:
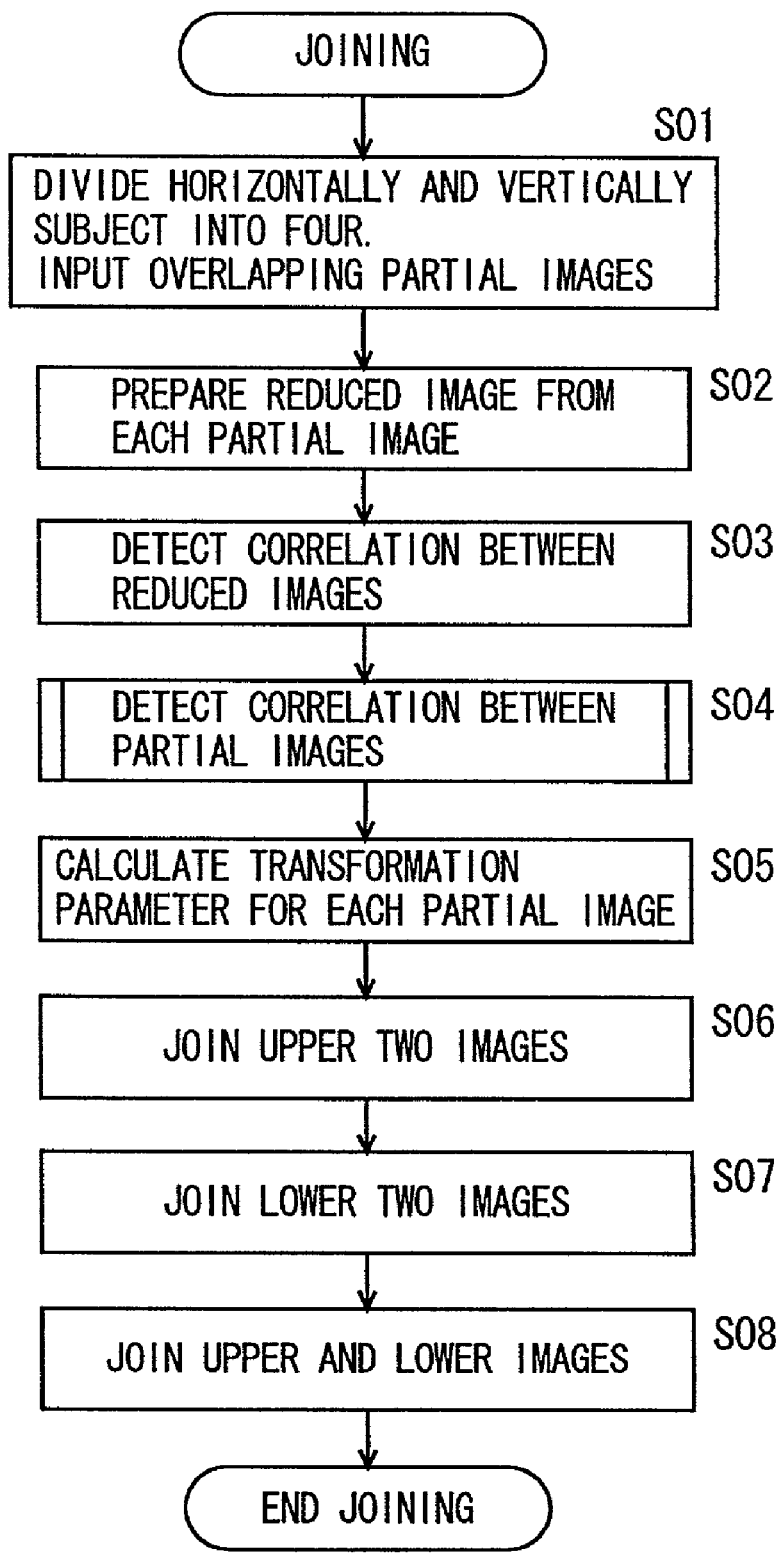
FIG. 14 is a flowchart showing a flow of joining processing performed by a CPU of a scanner of the embodiment.

FIG. 14 shows a flowchart of the joining processing performed by CPU 100 in scanner 1 of the embodiment. FIG. 14 shows the processing for joining the four partial images obtained from a subject which is divided vertically and horizontally into four. The joining processing performed by CPU 100 is not restricted to the case of handling the four partial images, and can be applied to all the cases handling two or more partial images.

For the joining process shown in FIG. 14, image-taking by CCD 104 and movement of CCD 104 by moving portion 106 are repeated. Thereby, partial images are obtained from the subject divided into four, and the partial images thus obtained are stored in RAM 108 (step S01). The four partial images stored in RAM 108 have overlap regions each overlapping with the neighboring image(s).

In step S01, CPU 100 sends control signals to CCD 104 and moving portion 106 so that the partial images obtained by CCD 104 are stored in RAM 108.

In a next step S02, the four partial images stored in RAM 108 are reduced into four reduced images, respectively. A correlation between the four reduced images is detected (step S03). The correlation between the reduced images is the relative positional relationship between the neighboring two images. For example, the relative positional relationship between the upper left partial image P and the upper right partial image Q can be detected by determining, in each of the reduced images prepared by reducing the respective partial images, a distribution of a horizontal projective histogram of pixel values in the overlap region of the reduced images, and comparing the determined distributions thus determined. Thereby, it is possible to determine whether each of the two partial images is located at a higher or lower position with respect to the other. The positional relationship between the upper and lower left partial images P and R can be detected by obtaining and comparing the distributions of the projective histograms of the reduced images prepared by reducing the respective partial images. Thereby, it is possible to determine whether each of the upper and lower left partial images P and Q is located on the right or left of the other partial image.

In a step S04, the correlation between the partial images is detected (step S04). For the correlation between the partial images, the corresponding points in the neighboring partial images are detected. The processing in step S04 will be described later.

In a next step S05, transformation parameters between the partial images are calculated. Calculation of the transformation parameters is similar to the foregoing processing performed in transformation parameter detecting portion 114, and therefore description thereof is not repeated.

Based on the corresponding points obtained in step S04 and the transformation parameters obtained in step S05, upper left partial image P and upper right partial image Q are joined together (step S06).

In a step S07, the two lower partial images, i.e., lower left partial image R and lower right partial image S are joined together. The images joined together in step S06 are joined to the images joined together in step S07 (step S08). The joining processing performed in steps S06, S07 and S08 are similar to those performed in joining portion 116 described before, and therefore description thereof is not repeated.

Figure 15:
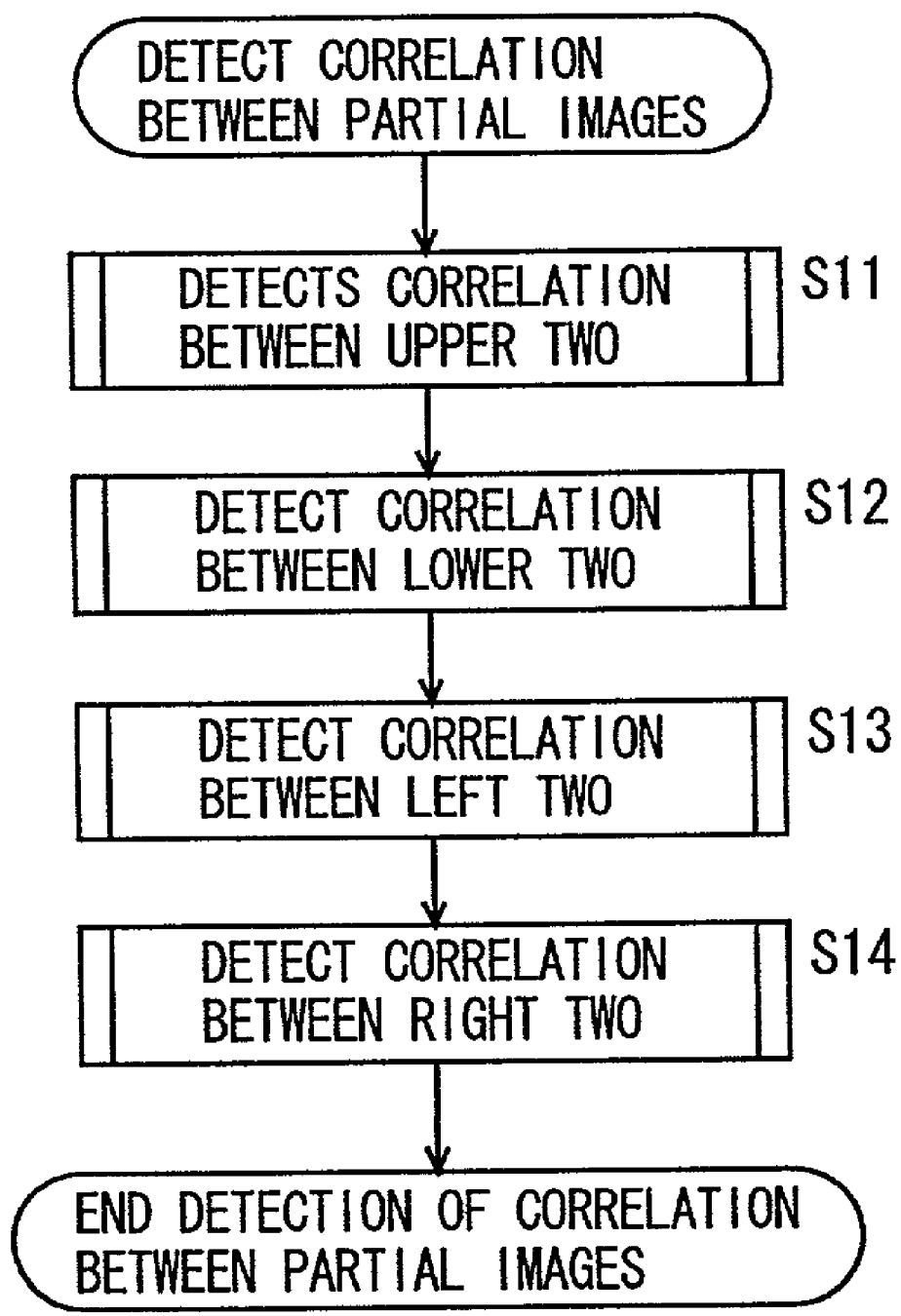
FIG. 15 is a flowchart showing flows of processing of detecting a correlation between partial images in a step S04 shown in FIG. 14.

FIG. 15 is a flowchart showing a flow of the processing, which is performed in step S04 in FIG. 14 for detecting the correlation between the partial images. Referring to FIG. 15, the correlation between the upper left partial image P and upper right partial image Q are detected in a step S11. In a step S12, the correlation is detected between the lower left partial image R and lower right partial image S. In a step S13, the correlation between upper and lower left partial images P and R is detected. In a step S14, the correlation between the upper and lower right partial images Q and S is detected.

Figure 16:
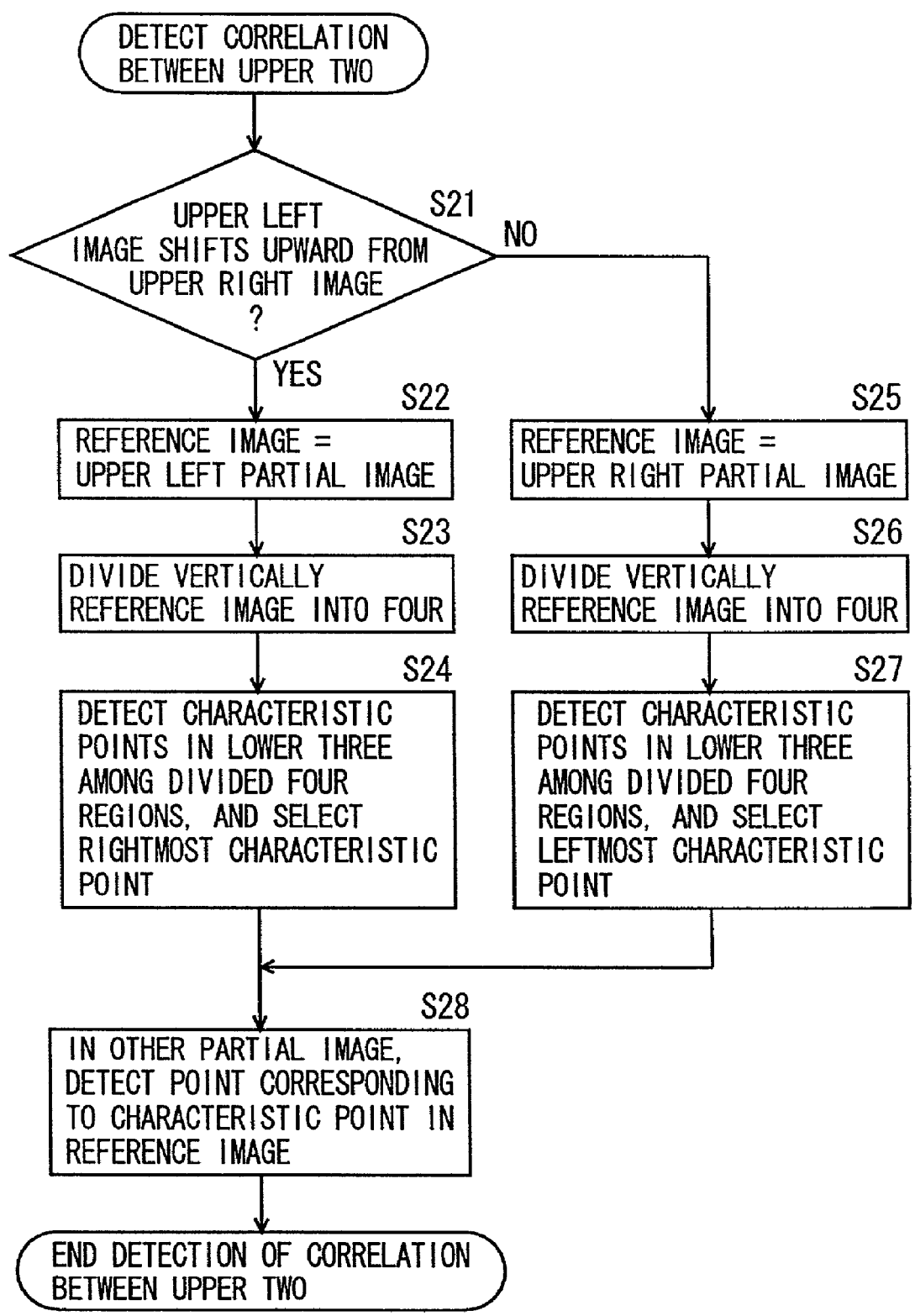
FIGS. 16–19 are flowcharts showing flows of correlation detecting processing performed in steps S11–S14 shown in FIG. 15, respectively.

FIG. 16 is a flowchart showing a flow of the processing, which is performed in step S11 in FIG. 15 for detecting the correlation. From the correlation between the reduced images obtained in step S03 shown in FIG. 14, it is determined in a step S21 shown in FIG. 16 whether upper left partial image P is shifted upward from upper right partial image Q or not. This is performed for the determination of the relative positions between the upper left and upper right partial images. If the upper left partial image is shifted upward with respect to the upper right partial image, the process moves to a step S22. Otherwise, the process moves to a step S25.

In step S22, upper left partial image P is used as a reference image, and this reference image is vertically divided into four in a step S23. In a step S24, the following processing is effected on the lower three regions among the four divided regions prepared in step S23.

(1) Characteristic points are detected.

(2) The characteristic point in the rightmost position is selected from the detected characteristic points.

In a step S25, upper right partial image Q is set as the reference image, and this reference image is vertically divided into four in a step S26.

Among the divided four regions, the following processing is effected on the lower three regions.

(1) Characteristic points are detected.

(2) The characteristic point in the left end is selected from the detected characteristic points.

Thereby, one characteristic point in the leftmost position is selected in each of the lower three regions.

In a step S28, the characteristic point corresponding to the characteristic point in the reference image is detected from the other partial image (i.e., upper right partial image Q if the reference image is upper left partial image P, and upper left partial image P if the reference image is upper right partial image Q). The characteristic points thus detected are handled as the corresponding points.

Figure 17:
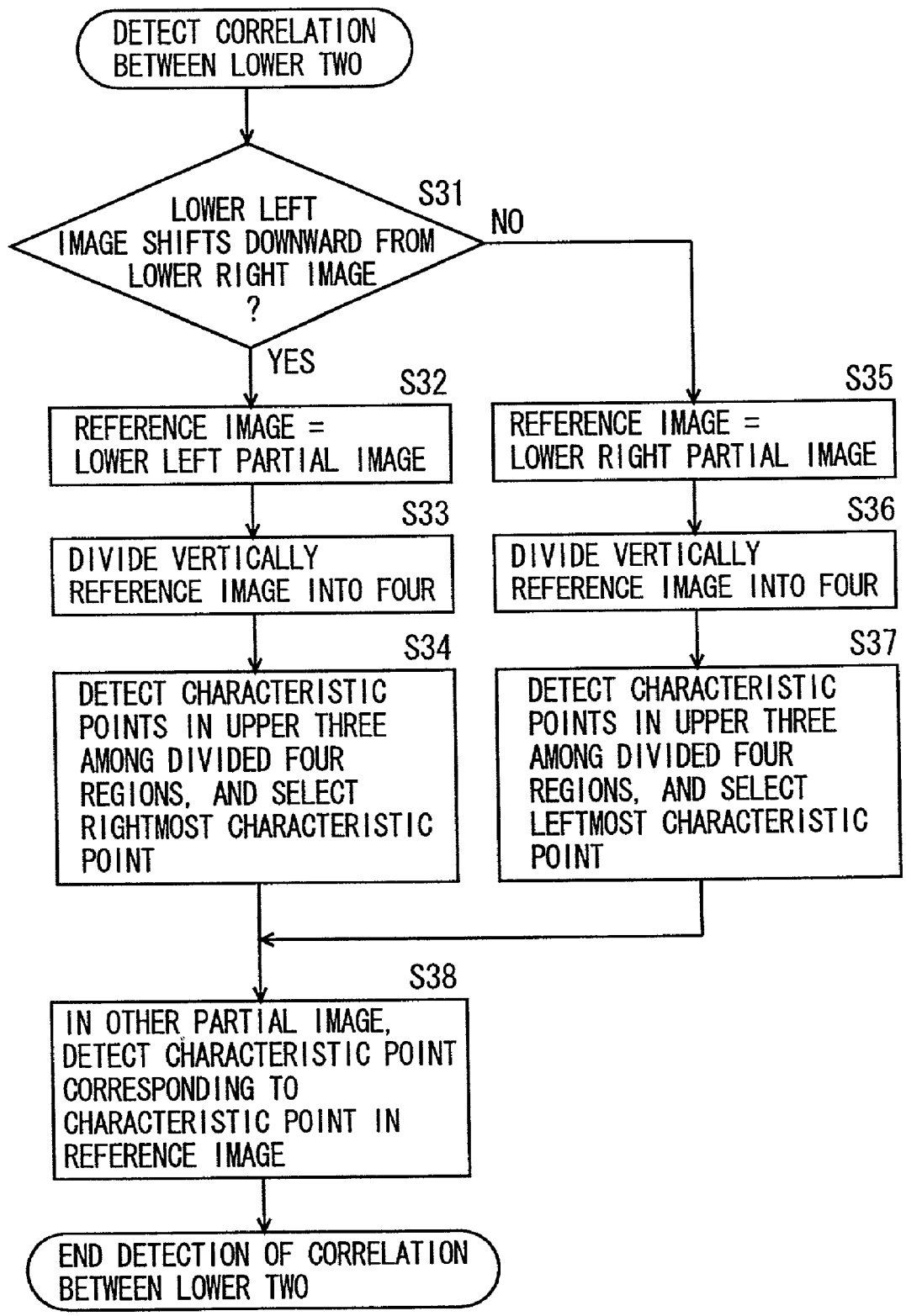

FIG. 17 is a flowchart showing a flow of correlation detecting processing performed in step S12 shown in FIG. 15. Referring to FIG. 17, it is determined in step S31 whether lower left partial image R is shifted downward with respect to lower right partial image S or not. If shifted, the process moves to a step S32. If not, the process moves to a step S35.

In a step S32, lower left partial image R is set as the reference image, and this reference image is vertically divided into four in a step S33. Among the divided four regions, the following processing is effected on the upper three regions in a step S34.

(1) Characteristic points are detected.

(2) The characteristic point in the rightmost position is selected from the detected characteristic points.

In a step S35, lower right partial image S is set as the reference image, and this reference image is vertically divided into four in a step S36. Among the divided four regions, the following processing is effected on the upper three regions in a step S37.

(1) Characteristic points are detected.

(2) The characteristic point in the leftmost position is selected from the detected characteristic points.

In a step S38, the characteristic point corresponding to the characteristic point in the reference image is detected from the other partial image (i.e., lower right partial image S if the reference image is lower left partial image R, and lower left partial image R if the reference image is upper right partial image Q).

In this manner, the three corresponding points are detected in each of the lower left and lower right partial images.

Figure 18:
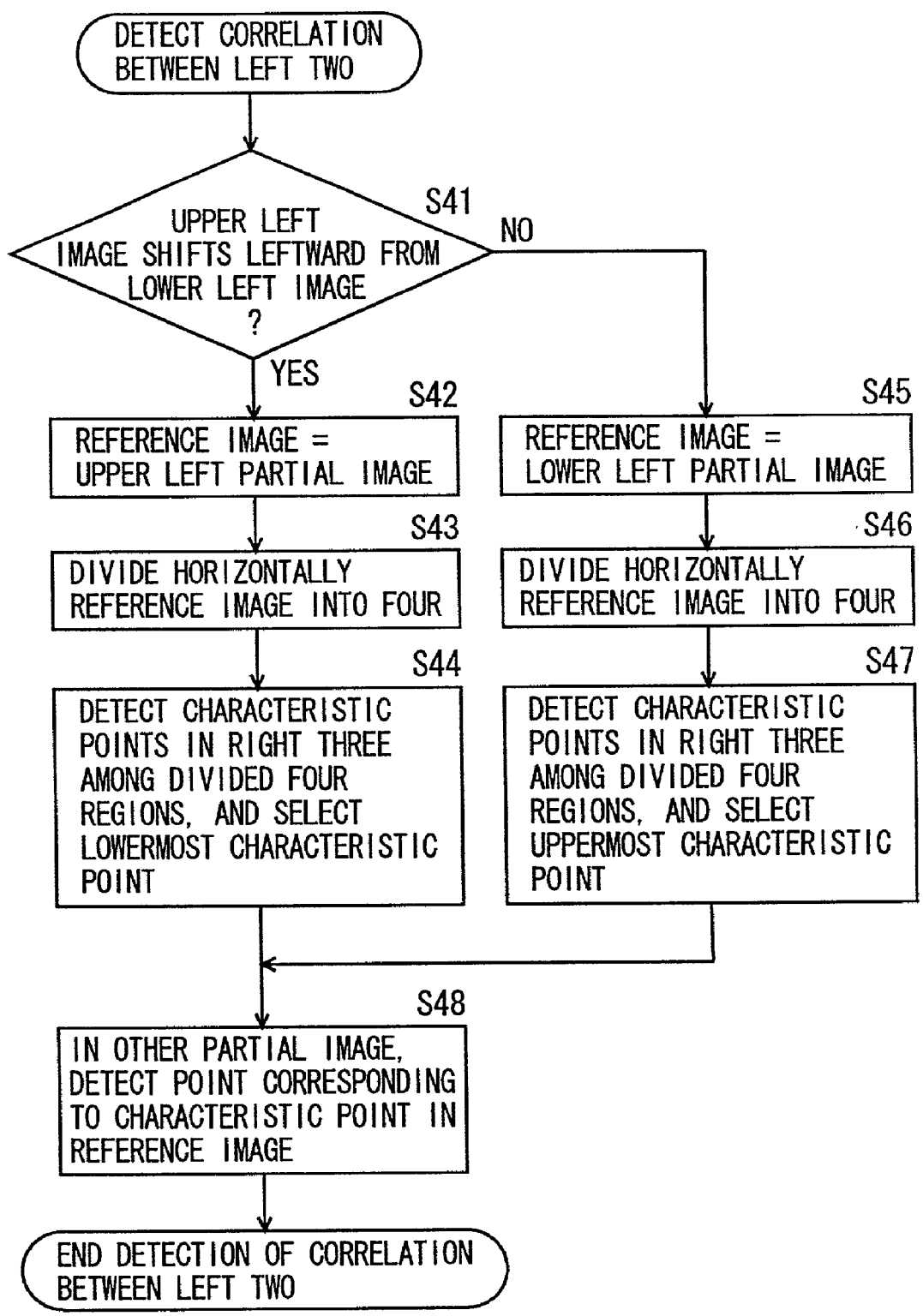

FIG. 18 is a flowchart showing a flow of the correlation detecting processing performed in step S13 shown in FIG. 15. Referring to FIG. 18, it is determined in step S41 whether upper left partial image P is shifted leftward with respect to lower left partial image R or not. If shifted, the process moves to a step S42. If not, the process moves to a step S45.

In step S42, upper left partial image P is set as the reference image, and this reference image is vertically divided into four in a step S43. Among the divided four regions, the following processing is effected on the three right regions in step S44.

(1) Characteristic points are detected.

(2) The characteristic point in the lowermost position is selected from the detected characteristic points.

In a step S45, lower left partial image R is set as the reference image, and this reference image is vertically divided into four in a step S46. Among the divided four regions, the following processing is effected on the three right regions in a step S47.

(1) Characteristic points are detected.

(2) The characteristic point in the uppermost position is selected from the detected characteristic points.

In a step S48, the characteristic point corresponding to the characteristic point in the reference image is detected from the other partial image (i.e., lower left partial image R if the reference image is upper left partial image P, and upper left partial image P if the reference image is lower left partial image R).

In this manner, the three corresponding points are detected in each of the upper and lower left partial images P and R.

Figure 19:
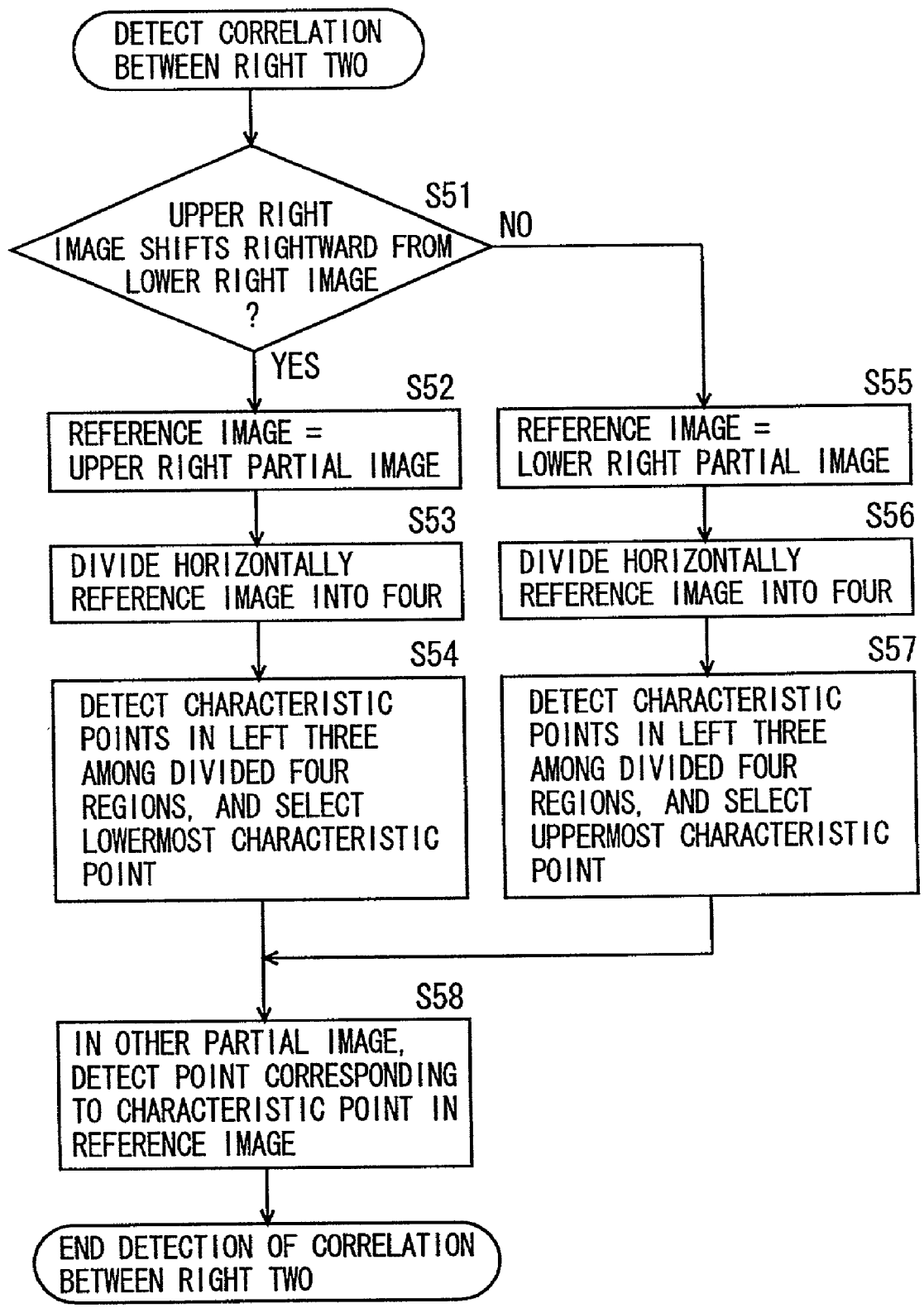

FIG. 19 is a flowchart showing a flow of the correlation detecting processing performed in step S14 shown in FIG. 15. Referring to FIG. 19, it is determined in step S51 whether upper right partial image Q is shifted rightward from lower right partial image S or not. If shifted, the process moves to a step S52. If not, the process moves to a step S55.

In a step S52, upper right partial image Q is set as the reference image, and this reference image is vertically divided into four in a step S53. Among the divided four regions, the following processing is effected on the three left regions in step S54.

(1) Characteristic points are detected.

(2) The characteristic point in the lowermost position is selected from the detected characteristic points.

In a step S55, lower right partial image S is set as the reference image, and this reference image is vertically divided into four in a step S56. Among the divided four regions, the following processing is effected on the three left regions in a step S57.

(1) Characteristic points are detected.

(2) The characteristic point in the uppermost position is selected from the detected characteristic points.

In a step S58, the characteristic point corresponding to the characteristic point in the reference image is detected from the other partial image (i.e., lower right partial image S if the reference image is upper right partial image Q, and upper right partial image Q if the reference image is lower right partial image S).

In this manner, the three corresponding points are detected in each of the upper and lower right partial images Q and S.

According to the joining process performed by CPU 100 in scanner 1 of this embodiment, as described above, the corresponding points corresponding together and located in the two partial images to be joined are detected from each of the three regions among the divided four regions. Therefore, the corresponding points spaced by a predetermined distance are detected. Therefore, the partial images, which are subjected to the geometric transformation based on the transformation parameters calculated in step S05, are transformed in the optimum manner so that it is possible to prevent lowering of the quality of the image completed by joining.

Since the corresponding points, which are present in the partial images to be joined and correspond to each other, can be reliably detected, the processing time can be reduced.

Further, the corresponding points are detected by dividing the reference image into four. Therefore, there is a high possibility that the corresponding point is detected in the region, where the partial image overlaps with the overlap region defined by the overlapping portions of the other two partial images to be joined. Therefore, the transformation parameter can be obtained while placing importance on the corresponding points in the region near the center of the image formed of the joined images. As a result, it is possible to prevent deterioration of the quality in the central portion of the image formed of the joined images.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device for producing an entire image of a subject by joining a plurality of divided images produced from divided portions defined in said subject and having partially overlapping regions, comprising:

a setting portion for setting a plurality of sets each including corresponding points in the two divided images having the overlap regions overlapping with each other;

a transforming portion for performing geometric transformation of one or both of the two divided images based on said plurality of corresponding point sets; and a joining portion for joining the two divided images based on the plurality of corresponding point sets after the geometric transformation, wherein a significant overlap region is determined among overlap regions of each image, said significant overlap region is a region where the largest number of said divided images overlap with each other, and said joining portion joins said divided images by placing importance on said significant overlap region.

2. The image processing device according to claim 1, wherein, said setting portion sets in said specific region the corresponding point sets larger in number than those in another region for placing importance on said specific region.

3. The image processing device according to claim 1, wherein, said transforming portion performs geometric transformation using the transformation parameter obtained by giving high weight to the corresponding point set in said specific region for placing importance on said specific region.

4. The image processing device according to claim 1, further comprising:

an image obtaining portion for obtaining the plurality of divided images produced from divided portions defined in a subject and having partially overlapping regions; and a detecting portion for detecting a direction of positional shift between the two divided images having the overlap regions overlapping with each other, wherein the setting portion sets the plurality of sets each including corresponding points in said two divided images based on the detected positional shift direction; and for every set of two images that are joined together, said corresponding points are set based on one of the two divided images located further remotely from a region where at least three partial images including the other of the two divided images overlap with each other.

5. An image processing method comprising the steps of:

obtaining a plurality of divided images produced from divided portions defined in a subject and having partially overlapping regions; and producing an entire image representing said subject by joining said plurality of divided images, wherein a significant overlap region is determined among overlap regions of each image, said significant overlap region is a region where the largest number of said divided images overlap with each other, and joining said plurality of divided images includes placing importance on said significant overlap region.

6. The image processing method according to claim 5, wherein said plurality of divided images include at least first, second, third and fourth divided images arranged in upper right, upper left, lower right and lower left positions, and said four divided images overlap with each other in a region defined by a central portion of said entire image.

7. The image processing method according to claim 5, further comprising the steps of:

setting the plurality of sets of corresponding points corresponding to each other and located in two divided images having the overlap regions overlapping with each other; and performing geometric transformation on one or both of said two divided images based on said plurality of corresponding point sets, wherein said two divided images are joined together after said geometric transformation.

8. The image processing method according to claim 5, further comprising the steps of:

detecting a direction of positional shift between two divided images having the overlap regions overlapping with each other;

setting a plurality of sets each including corresponding points in said two divided images based on the detected positional shift direction; and joining said two divided images based on the set corresponding point sets, wherein for every set of two images that are joined together, said corresponding points are set based on one of the two divided images located further remotely from a region where at least three partial images including the other of the two divided images overlap with each other.

9. The image processing method according to claim 8, wherein characteristic points corresponding to each other and located in the overlap regions of the divided images are detected based on the detected positional shift direction, and the detected characteristic points are set as the corresponding point set.

10. The image processing method according to claim 9, wherein the characteristic point is detected in the overlap region of one of said two divided images, a point corresponding to the detected characteristic point is detected in the overlap region of the other divided image, and a set of said characteristic points is set as the corresponding point set.

11. The image processing device according to claim 9, wherein, the characteristic points are detected in the overlap regions of said two divided images, respectively, and a set of the characteristics points corresponding to each other is set as the corresponding point set.

12. The image processing method according to claim 8, wherein the corresponding points set by said setting portion include corresponding points separated from each other by a prescribed distance.

13. A computer readable medium bearing an image processing program, the program, when executed, causing a computer to execute the steps of:

obtaining a plurality of divided images produced from divided portions defined in a subject and having partially overlapping regions; and producing an entire image representing said subject by joining said plurality of produced divided images, wherein a significant overlap region is determined among overlap regions of each image, said significant overlap region is a region where the largest number of said divided images overlap with each other, and joining said divided images includes placing importance on said significant overlap region.

14. The computer readable medium bearing an image processing program according to claim 13, the program, when executed, causing the computer to further execute the steps of:

detecting a direction of positional shift between the two divided images having the overlap regions overlapping with each other;

setting a plurality of sets each including corresponding points in said two divided images based on the detected positional shift direction; and joining said two divided images based on the set corresponding point sets, wherein for every set of two images that are joined together, said corresponding points are set based on one of the two divided images located further remotely from a region where at least three partial images including the other of the two divided images overlap with each other.

15. An image processing device for producing an entire image of a subject by joining a plurality of divided images produced from divided portions defined in said subject and having partially overlapping regions, comprising:

a setting portion for setting a plurality of sets each including corresponding points in the two divided images having the overlap regions overlapping with each other;

a transforming portion for performing geometric transformation of one or both of the two divided images based on said plurality of corresponding point sets; and a joining portion for joining the two divided images based on the plurality of corresponding point sets after the geometric transformation, wherein a significant overlap region is determined among overlap regions of each image, said significant overlap region is a region where the largest number of said divided images overlap with each other, and said joining portion joins said divided images by placing importance on said significant overlap region which is near the center of a joined image formed by joining all of said divided images.

16. The image processing device according to claim 15, wherein the corresponding points set by said setting portion include corresponding points separated from each other by a prescribed distance.

* * * * *